United States Patent [19]

Wilber

[11] 4,138,849
[45] Feb. 13, 1979

[54] EXHAUST BRAKING VALVE

[75] Inventor: Dennis A. Wilber, Elizabethtown, Ind.

[73] Assignee: Cummins Engine Company, Inc., Columbus, Ind.

[21] Appl. No.: 803,432

[22] Filed: Jun. 6, 1977

[51] Int. Cl.² ............................................. F02B 37/00
[52] U.S. Cl. ....................................... 60/602; 138/45; 415/151
[58] Field of Search ................ 60/600, 602, 605, 614, 60/615; 138/45, 45 A; 415/148, 151, 157

[56] References Cited

U.S. PATENT DOCUMENTS

| 1,816,787 | 7/1931 | Moss | 60/602 |
| 2,355,177 | 8/1944 | Pescara | 60/615 X |
| 2,621,012 | 12/1952 | Graham | 138/45 A X |

FOREIGN PATENT DOCUMENTS

| 903517 | 2/1954 | Fed. Rep. of Germany | 415/148 |
| 924760 | 5/1963 | United Kingdom | 60/602 |

Primary Examiner—William L. Freeh
Assistant Examiner—Michael Koczo, Jr.
Attorney, Agent, or Firm—Neuman, Williams, Anderson & Olson

[57] ABSTRACT

An exhaust braking valve is provided for use on an internal combustion engine having an exhaust manifold and a turbocharger associated therewith. The braking valve comprises a hollow section having an inlet communicating with the discharge side of the exhaust manifold and an outlet communicating with the intake for the turbine section of the turbocharger. Disposed within the hollow section is an adjustable member having a flow passage formed therein which, when the member is in a selected first position of adjustment, interconnects the inlet and outlet and effects unrestricted gas flow through the valve. When the adjustable member is in a selected second position of adjustment, a segment thereof assumes a gas flow blocking relation with respect to the inlet and outlet of the hollow section. The segment of the adjustable member is provided with bleeder means whereby, when the segment is in the gas flow blocking position, a sufficient amount of gas will flow therethrough to maintain rotation of the turbine wheel while a predetermined engine braking back pressure is maintained within the exhaust manifold.

4 Claims, 5 Drawing Figures

EXHAUST BRAKING VALVE

BACKGROUND OF THE INVENTION

Various exhaust braking devices have heretofore been provided for use on internal combustion engines embodying a turbocharger. Because of the design of such devices, they are possessed of one or more of the following shortcomings: (a) it is of bulky, complex construction and requires an inordinate amount of space when installed on an engine; (b) it is ineffective in controlling the maximum back pressure which is developed within the exhaust manifold and thus rendering the engine highly susceptible to damage; (c) when the device is in a back pressure developing mode, the turbine wheel of the turbocharger is idle thereby rendering various oil seals embodied in the turbocharger susceptible to leakage; (d) it causes slower acceleration of the turbine wheel when the device is moved from a braking mode to a non-braking mode; and (e) the device is highly susceptible to malfunction.

SUMMARY OF THE INVENTION

Thus, it is an object of the invention to provide an exhaust braking valve which avoids all of the aforenoted shortcomings.

It is a further object of the invention to provide an exhaust braking valve which may be readily installed on various types and sizes of engines and turbochargers.

It is a still further object of the invention to provide an exhaust braking valve which may be incorporated in and made integral with the housing for the turbocharger.

It is a still further object of the invention to provide an exhaust braking valve wherein the adjustment thereof is not impaired by the gas flow from the exhaust manifold.

It is a further object of the invention to provide an exhaust braking valve which may be readily serviced when required without the entire valve being removed from the engine and/or the turbocharger.

Furthr and additional objects will appear from the description, accompanying drawings, and appended claims.

In accordance with one embodiment of the invention, an exhaust braking valve is provided which includes a hollow section having an inlet connected to the discharge side of the exhaust manifold of an internal combustion engine. The hollow section is also provided with an outlet which communicates with the intake of a turbine section of a turbocharger. Disposed within the hollow section and located intermediate the inlet and outlet thereof is a rotor which is adapted to be selectively rotated between selected first and second positions. The rotor is provided with a flow passage which interconnects the inlet and outlet and permits unrestrictive gas flow therethrough when the rotor is in the selected first position. When the rotor is in the selected second position, a segment of the rotor is disposed in a gas flow blocking mode with respect to the inlet and outlet. The rotor segment is provided with bleeder means whereby, when the segment is in the gas flow blocking mode, a sufficient amount of gas will continue to flow therethrough and maintain rotation of the turbine wheel while a predetermined engine braking back pressure is maintained within the exhaust manifold.

DESCRIPTION

For a more complete understanding of the invention reference should be made to the drawings, wherein.

Figure 1:
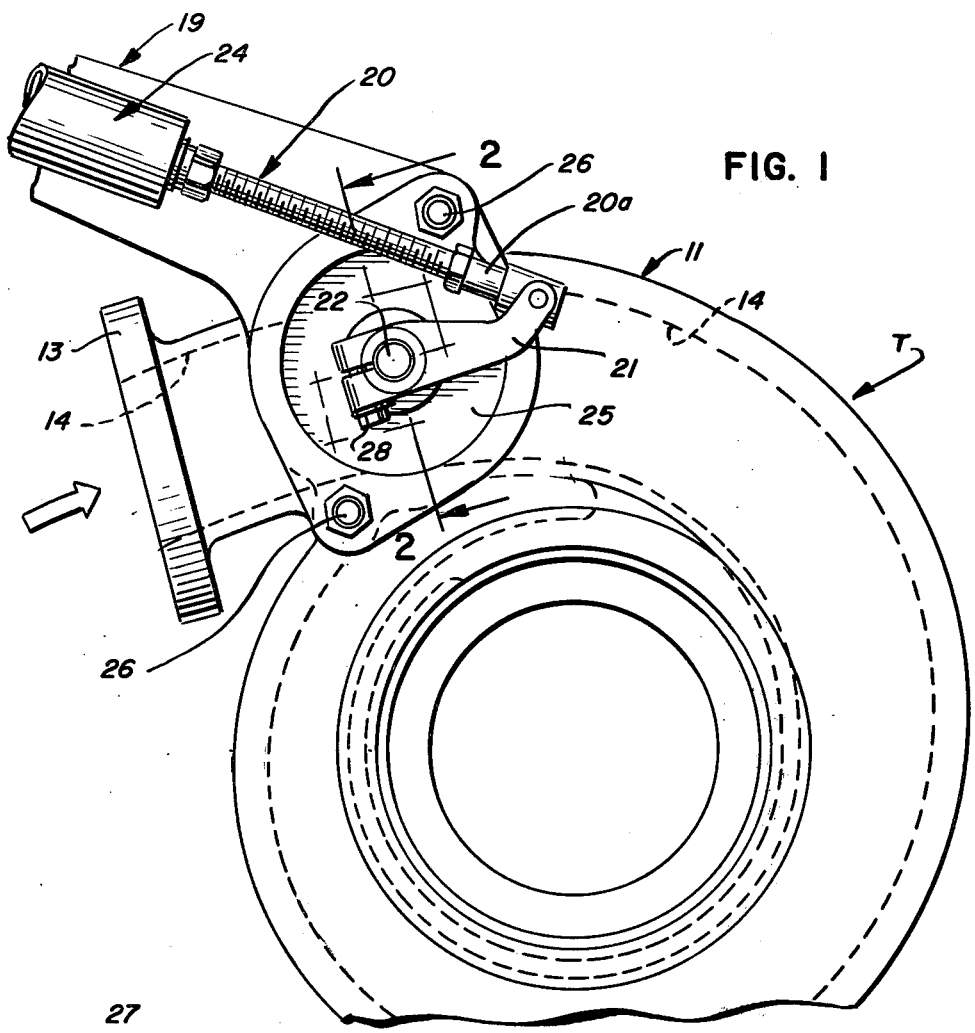
FIG. 1 is a side elevational view of one form of the improved exhaust braking valve shown mounted on the housing of a turbocharger.

Referring now to the drawings and more particularly to FIG. 1, one form of the improved exhaust braking valve 10 is shown mounted on and forming a part of the housing 11 of a turbocharger T, the latter being of a type particularly suitable for use on a diesel engine, not shown. The housing 11 is provided with an inlet 12 delimited by a flange 13 for facilitating attachment of the housing to the discharge side of the exhaust manifold of the engine, not shown.

Located downstream of the housing inlet 12 is a substantially cylindrical cavity or hollow section C, the axis of which is transverse to the direction of normal gas flow through a passage 14 formed in the housing and extending from inlet 12 to a chamber, not shown, accommodating the turbine wheel of the turbocharger T. The passage 14 is interrupted by the cavity.

Figure 2:
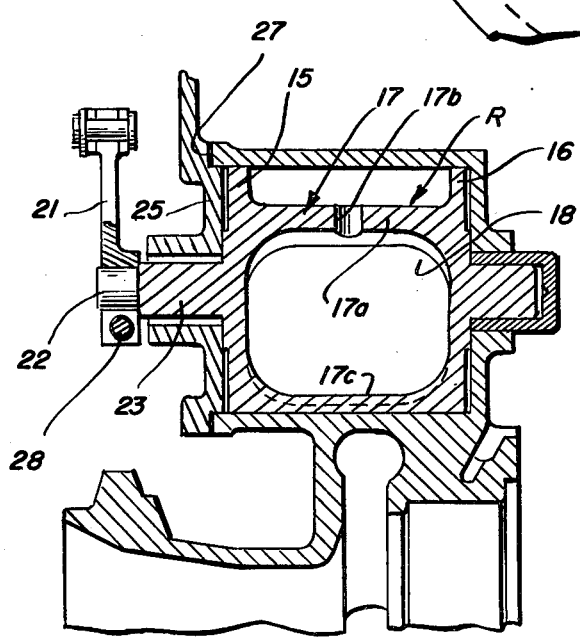
FIG. 2 is a fragmentary sectional view taken along line 2—2 of FIG. 1.
Figure 3:
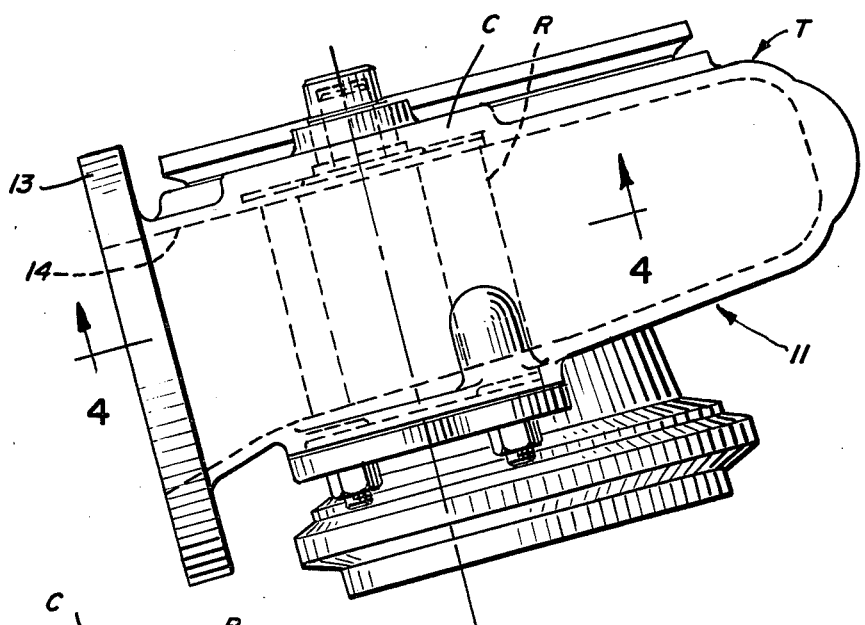
FIG. 3 is a fragmentary top view of the valve of FIG. 1.
Figure 4:
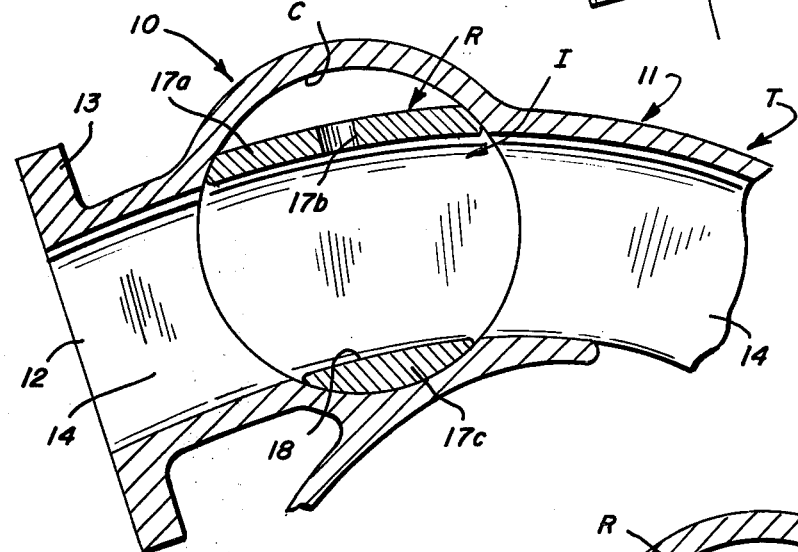
FIG. 4 is a fragmentary sectional view taken along line 4—4 of FIG. 3 and showing the valve rotor in a non-braking mode.
Figure 5:
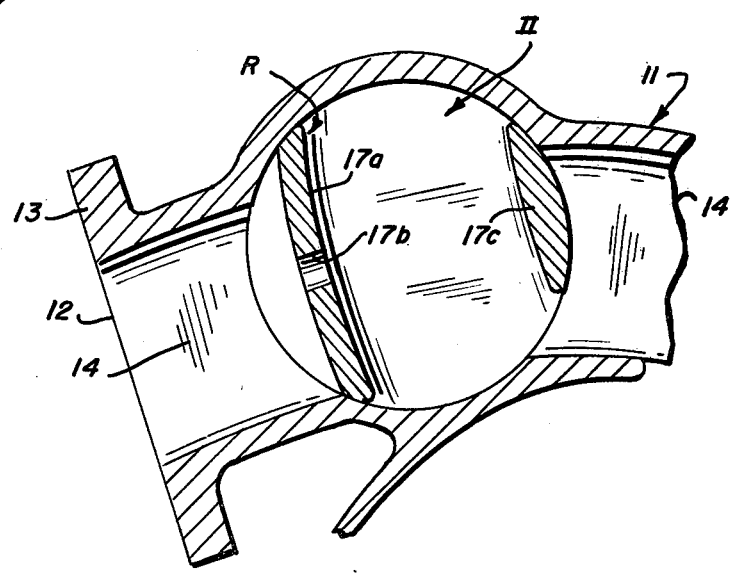
FIG. 5 is like FIG. 4 but showing the valve rotor in a gas flow blocking or braking mode.

Mounted within cavity C is a rotor R which is adapted to be selectively rotated between a first position (non-braking mode) I, shown in FIG. 4, and a second position (braking mode) II, shown in FIG. 5. Rotor R, as seen more clearly in FIG. 2, is provided with a pair of spaced substantially parallel end walls 15, 16. Each end wall has an annular peripheral configuration corresponding substantially to the configuration of the adjacent portion of cavity surface and the end walls are in sliding sealing engagement with the cavity surface. Disposed intermediate the end walls is a center portion 17 in which is formed a flow passage 18. When the rotor R is in its non-braking mode I, passage 18 is aligned witht the passage 14 formed in the turbocharger housing 11, see FIG. 4, so that gas flow from the inlet 12 to the turbine wheel chamber, not shown, is not restricted by the rotor. Thus, to attain this result, the cross-sectional configuration of passages 14, 18 is substantially the same.

When rotor R is moved to its blocking mode II, see FIG. 5, one segment 17a of the center portion 17 is disposed in a position substantially transverse to the direction of normal gas flow in passage 14. The length of segment 17a is such that it extends beyond the cross-sectional area of passage 14. Formed centrally of segment 17a is a small opening 17b which permits a small amount of gas flow past segment 17a and into the chamber, not shown, thereby maintaining turbine wheel rotation and, thus, prevent any oil leakage through the seals surrounding the shaft of the wheel.

Diametrically opposite segment 17a is a second segment 17c of the center portion of the rotor. The segments 17a and c define the upper and lower limits, respectively, of the rotor passage 18, as seen in FIG. 4. Segment 17c is the smaller of the two segments and in the illustrated embodiment does not completely block off the passage 14, when the rotor is in mode II. Thus, the small gas flow which is permitted through opening 17b can pass around segment 17c.

The opening 17b in segment 17a is sized so as to produce the desired exhaust back pressure, when the rotor is in mode II and, thus, results in the desired braking effect on the engine. The back pressure developed can be varied between a minimum (FIG. 4) and a maximum (FIG. 5) through a hydraulic or pneumatic piston-cylinder assembly 19 which is mounted externally of the turbocharger housing, see FIG. 1. The rod 20 of the assembly 19 has an exposed end 20a thereof connected to a lever arm 21 which, in turn, is affixed to a stub 22 aligned with the rotor axle 23. The movement of the rod 20 relative to the cylinder 24 may be controlled through a hand, or foot, operated control, not shown, located within the cab of the diesel truck. In lieu of the assembly 19 a mechanical linkage, not shown, may be utilized to effect movement of lever arm 21. The use of a piston-cylinder assembly or a mechanical linkage for such a purpose is well known in the art.

As noted in FIGS. 1 and 2, one side of cavity C is formed by a removable plate 25 which is secured to the housing 11 by conventional bolts 26 or the like. Suitable gasketing material 27 is sandwiched between the plate and housing, see FIG. 2. Thus, replacement or servicing the rotor R, when required, is readily accomplished by merely removing bolts 26 and the locking bolt 28 holding the lever arm 21 on the stub 22.

It will be noted in FIG. 2 that segment 17a is recessed a substantial distance from the cavity surface, when the rotor is in mode I, and by reason of this fact the weight of the rotor can be made substantially smaller than might otherwise be the case. Furthermore, the valve hollow section C has heretofore been described as forming a part of the turbocharger housing, however, the invention is not intended to be so limited. For example, the hollow section may be formed as a separate unit which is disposed between the discharge port of the exhaust manifold and the inlet to the turbine section of the turbocharger, or in some instances the hollow section may be part of the exhaust manifold itself.

The rotor is of such configuration that adjustment thereof is not adversely effected by the gas flow direction. While the segment 17a of rotor R is shown as being provided with a small transverse opening 17b which permits bleeding of a predetermined amount of gas flow through the valve so as to continue rotation of the turbine wheel in the blocking mode, the opening 17b may be replaced by one or more peripheral notches being formed in segment 17a. Such notches could be sized to permit the desired gas flow, when the rotor is in its braking mode II.

The various components of the improved exhaust braking valve are of simple, compact construction and are not susceptible to malfunction. The valve is capable of being readily installed on a variety of internal combustion engines. The improved valve is easily serviced and permits the building of back pressure in the exhaust manifold to be effectively controlled.

I claim:

1. An exhaust gas braking valve for use with an internal combustion engine having an exhaust manifold and a turbocharger provided with a turbine wheel and a housing having a turbine wheel chamber, said valve comprising a hollow section having an inlet for communicating with the exhaust manifold and an outlet for communicating with the turbine wheel chamber, and a member mounted within said hollow section for selective rotary adjustment about a predetermined axis between braking and non-braking modes, axially spaced portions of said member being in journal support relation with said hollow section, said member being provided with a flow passage disposed intermediate said journal supported portions of said member and substantially transversely of said rotary axis and interconnecting said hollow section inlet and outlet and effecting substantially unrestricted exhaust gas flow through said valve, when said member is in said non-braking mode; said member, when in said braking mode, having a segment thereof disposed in substantially blocking relation with said hollow section inlet and outlet for substantially interrupting the exhaust gas flow, said segment being provided with bleeder means whereby a substantially reduced predetermined exhaust gas flow continues through the valve, when said member is in said braking mode, for maintaining rotation of the turbine wheel at an idling speed within the housing chamber while a predetermined engine exhaust gas back pressure is maintained within the exhaust manifold.

2. The exhaust gas braking valve of claim 1 wherein the bleeder means comprises an opening formed in the segment of said adjustable member and extending substantially transversely therethrough, the cross-sectional area of said opening being substantially less than the cross-sectional area of said flow passage.

3. The exhaust gas braking valve of claim 1 wherein the rotatable member is provided with a second segment spaced from the first mentioned segment, said segments being disposed on opposite sides of the rotary axis and coacting to define a gas flow passage through said member, said second segment having a cross-sectional area less than the cross-sectional area of said flow passage; the axially spaced portions of said member including cylindrical protuberances disposed within pockets formed in a chamber-forming surface of said hollow section, each cylindrical portion having a diameter substantially less than the maximum diameter of the portion of the member disposed intermediate said cylindrical portions.

4. An exhaust gas braking valve in combination with an exhaust manifold of an internal combustion engine and a turbocharger connected to said exhaust manifold and having a turbine wheel and a housing with a turbine wheel chamber, said valve including a hollow section formed within the turbocharger housing and upstream of said housing chamber, said hollow section having an inlet in communication with the exhaust manifold and an outlet spaced from said inlet and in communication with said housing chamber; and a member mounted within said housing chamber for selective rotary adjustment about a predetermined axis between braking and non-braking modes, axially spaced portions of said member being in journal support relation with a chamber-forming surface of said hollow section, said member being provided with a flow passage disposed intermediate said journal supported portions of said member and substantially transversely of said rotary axis and effecting substantially unrestricted exhaust gas flow from said exhaust manifold to said turbocharger housing chamber when said member is in said non-braking mode; said member, when in said braking mode, having a segment thereof disposed in substantially blocking relation with said hollow section inlet and outlet and substantially interrupting exhaust gas flow from said manifold to said housing chamber, said segment being provided with bleeder means whereby a substantially reduced predetermined exhaust gas flow continues through the valve, when said member is in the braking mode, for maintaining rotation of the turbine wheel at an idling speed within the housing chamber while a predetermined engine exhaust gas back pressure is maintained within the exhaust manifold.

* * * * *